United States Patent [19]

Crack

[11] Patent Number: 4,887,481
[45] Date of Patent: Dec. 19, 1989

[54] REMOTE CONTROL MECHANISMS

[75] Inventor: David J. Crack, Chelmsford, England

[73] Assignee: Morse Controls Limited, Basildon, England

[21] Appl. No.: 172,277

[22] Filed: Mar. 23, 1988

[30] Foreign Application Priority Data

Apr. 3, 1987 [GB] United Kingdom ............... 8707998

[51] Int. Cl.[4] .......................... F16C 1/10; G05E 1/04
[52] U.S. Cl. .................................. 74/500.5; 74/501.6; 74/523; 403/70; 403/316
[58] Field of Search ............... 74/500.5, 501.6, 502.4, 74/502.6, 523, 529; 403/69, 70, 71, 316, 317; 220/345, 346, 347

[56] References Cited

U.S. PATENT DOCUMENTS

| 3,253,480 | 5/1966 | Fernberg | 74/502.4 |
| 3,382,733 | 5/1968 | Miller | 74/523 |
| 3,546,962 | 12/1970 | Ruhala | 74/502.4 |
| 3,868,865 | 3/1975 | Neyer | 74/501.6 |
| 3,955,441 | 5/1976 | Johnson | 74/502.4 |
| 4,034,622 | 7/1977 | Deck | 74/500.5 |
| 4,534,239 | 8/1985 | Heimann | 74/502.4 |
| 4,535,646 | 8/1985 | Kohler | 74/500.5 |

FOREIGN PATENT DOCUMENTS

| 0068723 | of 1983 | European Pat. Off. | 74/529 |
| 0069646 | 1/1983 | European Pat. Off. | |
| 722661 | 7/1942 | Fed. Rep. of Germany | |
| 2936186 | 3/1981 | Fed. Rep. of Germany | |
| 60-30817 | 2/1985 | Japan | |

Primary Examiner—Gary L. Smith
Assistant Examiner—Flemming Saether
Attorney, Agent, or Firm—James Creighton Wray

[57] ABSTRACT

A control box includes a housing in which is pivoted a control lever having an aperture in its lower arm. The bent end of the core of a flexible cable is hooked into the aperture operatively to connect the control lever and the cable core. Swaged upon the cable casing is a cable hud having an annular groove fitted into a part-circular slot in the rear wall of the housing. The base of the housing is open and its peripheral wall is slotted at to provide guideways for a retainer slide of a resilient material which is slid into those slots to cover the open base. The rear end of the retainer slide includes a protuberance which, when the slide is fitted to the housing, will ride over a shoulder of the cable hub and snap home in the annular groove therein to engage the retainer slide with the cable hub. Such mutual engagement both positively retains the retainer slide in the housing and also anchors the cable casing to the housing, preventing the cable casing from making translational movement. The front end of the retainer slide has a longitudinal flange which is positioned to one side of and adjacent the bent end of the cable core, thereby acting as a stop to prevent the cable core from becoming detached from the control lever.

20 Claims, 5 Drawing Sheets

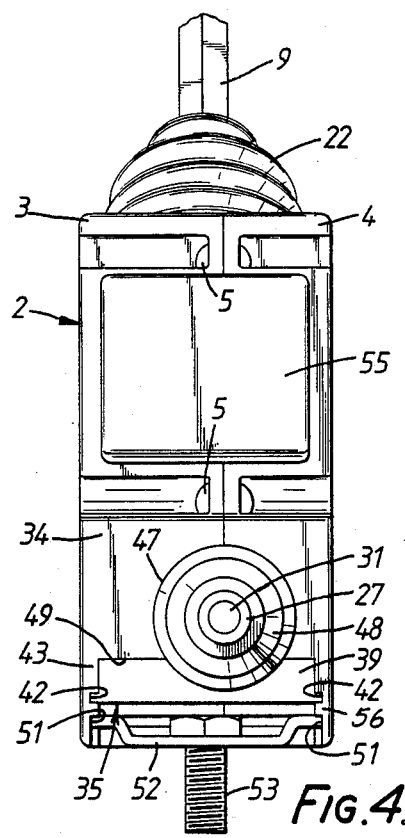
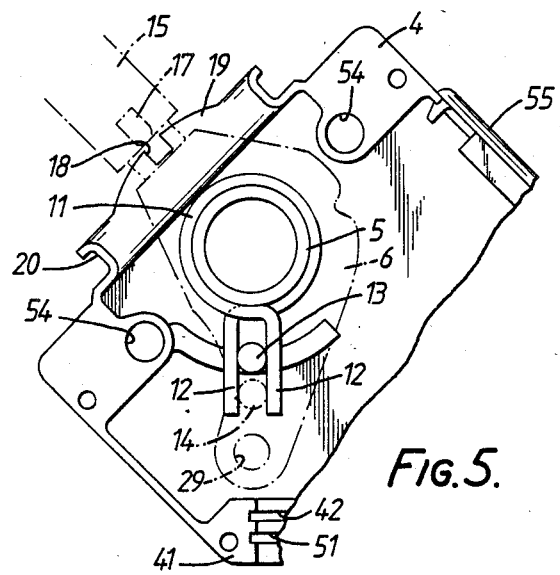

REMOTE CONTROL MECHANISMS

BACKGROUND OF THE INVENTION

1. Field of the Invention

This invention relates to remote control mechanisms.

2. Description of Related Art

Remote control mechanisms utilizing a flexible cable for transmitting motion between operator and operated stations are well known. With such a mechanism, the cable core is attached to movable operator and operated members so as to transmit motion from the one to the other, and the cable casing within which the core translates is restrained against movement. Conventionally, the cable core is attached as by threaded means to the operator and/or operated member, and the casing is clamped against movement. Such an arrangement requires the need for special tools apart from the act of assembly being relatively time consuming.

SUMMARY OF THE INVENTION

According to the invention there is provided a remote control mechanism comprising a member mounted for movement in a housing, a cable having a core translatable within a casing transverse aperture means associated with one of the cable core and the member for receiving a transverse connecting part associated with the other of the cable core and the member by which the cable core and the member are operatively connected, and cover plate means for fitment to the housing and serving to engage the cable casing with respect to the housing to prevent translation of the cable casing.

By means of the invention, the attachment of the cable core to a movable operator or operated member, as the case may be, and the restraining of the cable casing against movement at the operator or operated end of the remote control mechanism, can be carried out quickly and easily and without the need for special tools.

An embodiment of the invention which is at present preferred provides for attaching one end of the cable core to a movable operator member by hooking a bent end of the core through an opening in the wall of the housing and into an aperture in an operator lever which, when pivoted by manual effort applied to a lever handle, effects translation of the core. The lever is pivotally mounted in a control box housing. A retainer slide is fitted to the housing and is so constructed that it both provides a stop preventing lateral withdrawal of the hooked end of the cable core from the lever and also acts, in conjunction with the housing, to restrain the cable casing from movement when the core is translated. The retainer slide preferably makes resilient or snap engagement with a cable hub secured to the casing.

In order that the invention may be well understood the preferred embodiment thereof, given by way of example, will now be described with reference to the accompanying drawings.

BRIEF DESCRIPTION OF THE DRAWINGS

FIG. 4 is a partial end elevation of the same control box and control cable;

FIG. 5 is a partial side elevation corresponding to FIG. 2 but showing certain parts in broken outline;

DETAILED DESCRIPTION OF THE DRAWINGS

Figure 1:
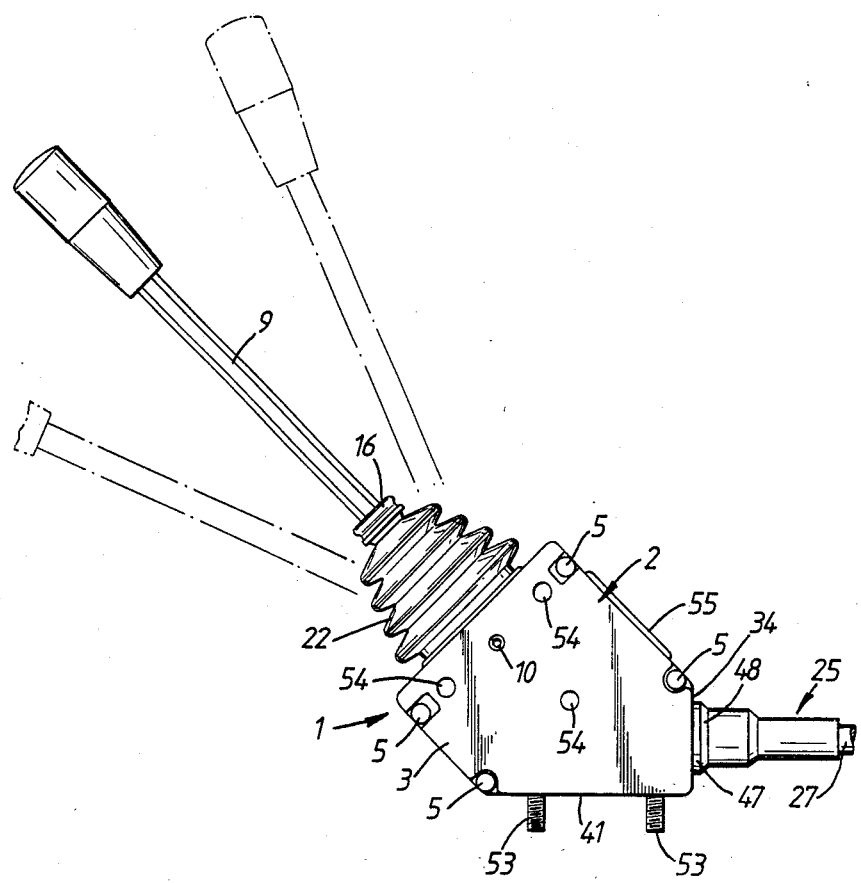
FIG. 1 is a side elevation of the operator end of a remote control mechanism comprising a control box assembled to a control cable.

As shown in FIG. 1, a control box 1 includes a housing 2 formed by housing halves 3 and 4 (shown in FIG. 2) secured together in any suitable manner as by rivets 5. The housing half 3 is larger than the housing half 4 but otherwise the housing halves are generally similar in shape. The housing halves include bearing flanges 5 (shown in FIG. 3) within which are journalled opposite pivot bosses 6 of a lever 7 (shown in FIG. 2) with the interposition therebetween of bearing shells 8. A lever handle 9 extends from one arm of the lever 7 and is suitably secured thereto. Thus, the lever handle 9 may be of polygonal cross-section and a push fit in a complementary aperture in the lever 7, a set screw 10 threaded into one of the pivot bosses 6 engaging a flat on the lever handle to hold the handle firmly in the lever.

The lever handle 9 can be pivotally moved either side of its neutral or central position shown in full lines in FIG. 1 to the phantom positions. Such pivotal motion is resisted by a torsion spring 11 (shown in FIG. 3) which tends to hold the lever 7 in the central position. The torsion spring is mounted around the bearing flange 5 of the shallow housing half 4 and is given a pre-load torque by its spring arms 12 being crossed and fitted either side of a pin 13 integral with that housing half, as shown in FIG. 5. A pin 14 integral with the lever 7 is also positioned between those spring arms 12 as indicated in FIG. 5 when the lever handle 9 is in its central position. Movement of the lever handle 9 to either side causes the lever pin 14 to urge one spring arm 12 away from the other which is restrained by the stationary pin 13 from movement, by which the torsion spring 11 is stressed and so ready to return the lever handle to the central position upon the manual operating load on it being removed.

Figure 2:
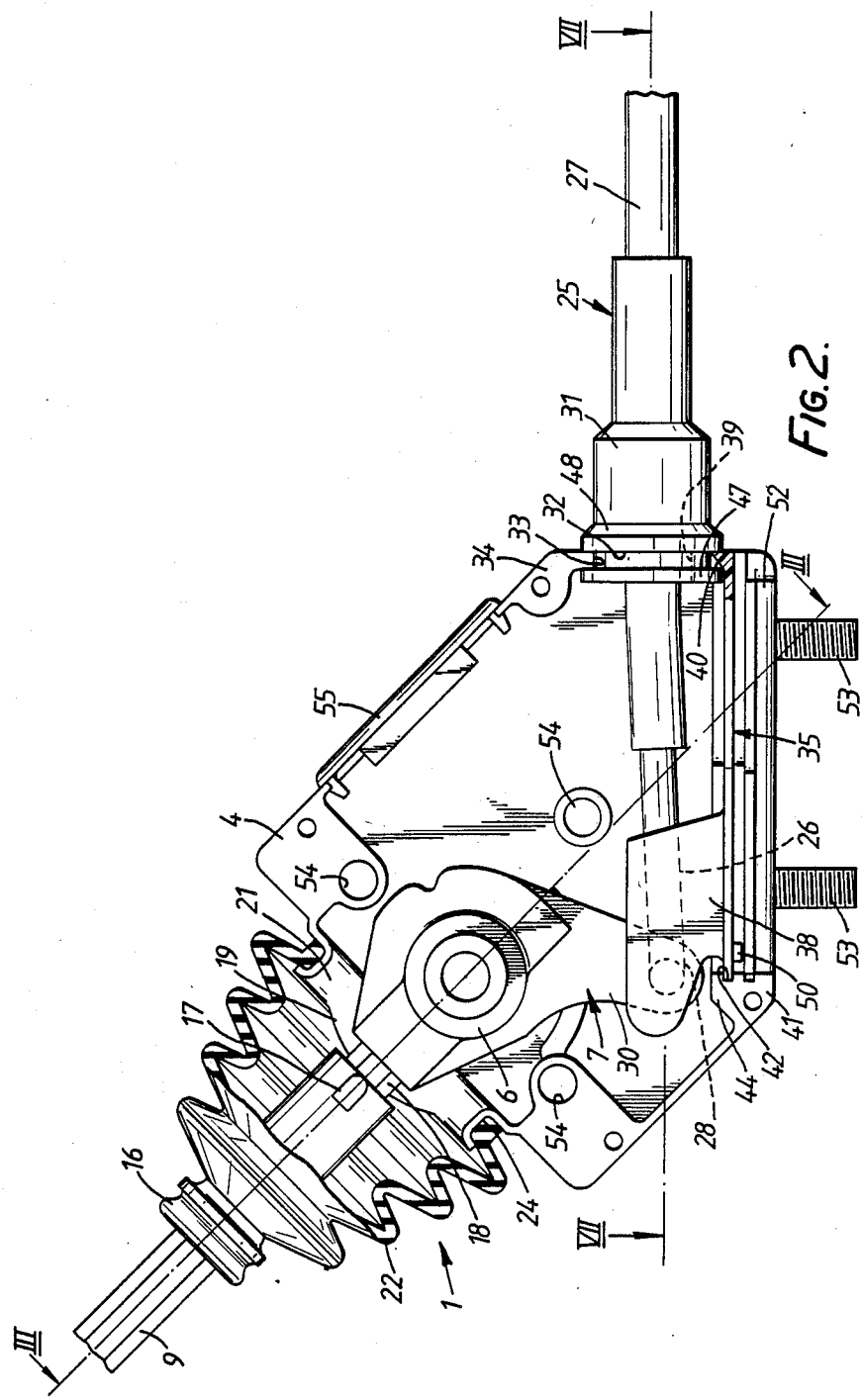
FIG. 2 is a partial side elevation of the same mechanism with a housing part of the control box removed.

A locking collar 15 is mountd on the lever handle 9 between a lower, locking position shown in FIG. 5 and an upper, free position illustrated in FIG. 2. The upper position is determined by the abutment of the uppermost end 16 of the locking collar 15 with a circlip (not shown) on the lever handle 9. The purpose of the locking collar 15 is to lock the lever handle 9 in its central position during storage and shipment of the control box 1. Locking is achieved by the locking collar 15 having radially opposed lugs 17 at its lower end engaging in complementary slots 18 fashioned in webs 19 on flanges 20 which extend from the uppermost surfaces of the hosing halves 3 and 4 to bound a slot 21 in the housing 2 through which the lever handle 9 is movable during its pivotal action. The upper edges of the webs 19 are curved complementary to the motion of the collar lugs 17 when freed from the locking slots 18 and during pivoting of the lever handle 9. Ingress of dirt or other extraneous matter into the housing 2 through the slot 21 is prevented by means of a gaiter 22 fitted at its upper and lower ends in annular slots 23 and 24 in the locking collar 15 and housing flanges 20, respectively.

A flexible cable 25 is fitted to the control box 1 to transmit pivotal motion of the lever 7 to a controlled member (not shown) which may take any of a number of different forms and serve any of a number of different functions. The present invention is particularly concerned with such fitment, ensuring same in a simple yet positive manner and without the need for any special tools.

The cable 25 has a translatable core 26 slidable within a casing 27. The core 26 is operatively attached to the lever 7 and the casing 27 is restrained against motion by being secured to the housing 2. The end 28 of the core 27 is bent and hooked into an aperture 29 in a lower arm 30 of the lever 7. A cable hub 31 is swaged upon the casing 27 and has an annular groove 32 fitted into edges 33 of the housing halves 3 and 4 which are shaped together to define a part-circular slot in the rear wall 34 of the housing 2. The hooked end 28 of the cable core 27 is held in the lever arm aperture 29 and the cable hub 31 is held at its annular groove 32 in the part-circular slot defined by the housing edges 33 by means of a retainer slide 35.

Figure 6:
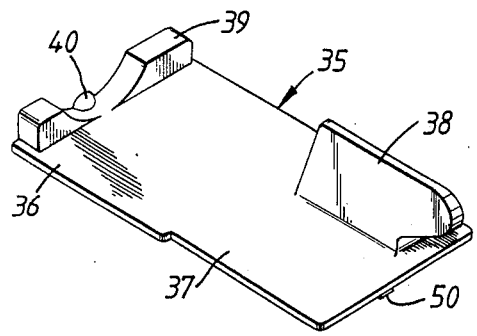
FIG. 6 is a perspective view of a mounting slide of the same control box.

The retainer slide 35 is best shown in FIG. 6 and comprises a cover plate whose rear part 36 is wider than the front part 37. A longitudinal flange 38 is upstanding from the front part of the cover plate and is spaced inwardly of one longitudinal edge thereof. Another flange 39 extends transversely of and is upstanding from the rear part 36 of the cover plate at its rearmost transverse edge. The flange 39 has a generally part-circular internal configuration with a protuberance 40 at its lowermost central part which serves a purpose to be explained.

The base 41 of the housing 2 is open and opposed slots 42 are provided in the housing halves 3 and 4 around the open base, that is to say in opposite side walls 43, 56 of those housing halves and in abutting front end wall 44 thereof. The front part 45 of the open base 41 is narrower than its rear part 46 so that the transverse dimension between the opposite longitudinal slots 42 in the open front part 45 is complementary to the width of the narrower front part 37 of the cover plate of the retainer slide 35 and the transverse dimension between the opposite longitudinal slots 42 in the open rear part 46 matches the width of the wider rear part 36 of the retainer slide. The described construction facilitates assembly of the retainer slide 35 to the housing 2.

To assemble the cable 25 to the control box 1, the bent end 28 of the cable core 27 is passed into the housing 2 through the open base 41 and hooked into the aperture 29 in the lower arm 30 of the lever 7, and the annular groove 32 in the cable hub 31 is fitted into the abutting edges 33 of the housing halves 3 and 4 defining the complementary part-circular slot in the housing rear wall 34. The retainer slide 35 is then fitted in position by being tilted so that its longitudinal flange 38 can be fed into the hollow interior of the housing 2 past the cable hub 31 and the rear wall 34 of the housing. The retainer slide 35 is then righted so that it is aligned with the slots 42, as is shown in FIG. 8. The narrower front part 37 of the cover plate of the retainer slide 35 is then slid into the longitudinal slots 42 bounding the narrower front opening 45 in the housing base 41 and, at the same time, the wider rear part 36 of the retainer slide cover plate is slid into the rearward region of the longitudinal slots 42 bounding the wider rear opening 46 in the housing base. The inward limit of travel is determined by the front part 37 of the retainer slide engaging in the transverse region of the slots 42 in the front end wall 44 of the housing 2, as shown in FIG. 7.

Figure 3:
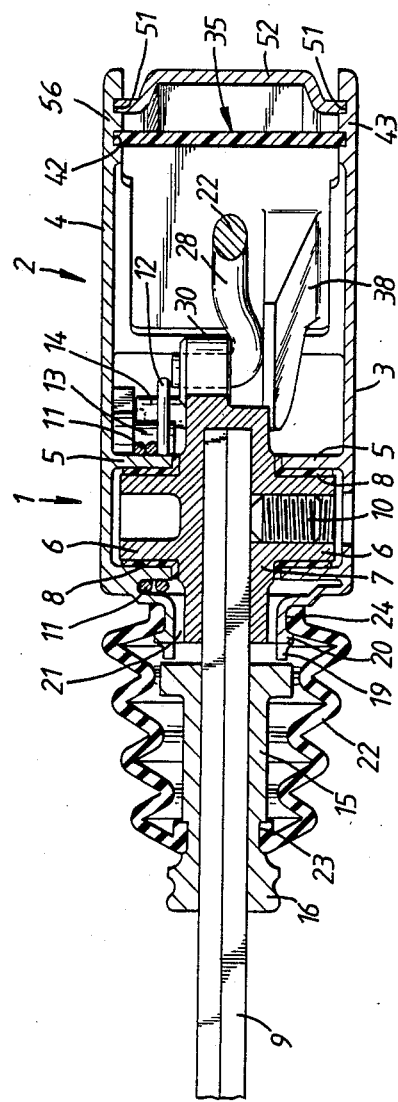
FIG. 3 is a section along line III—III of FIG. 2.
Figure 7:
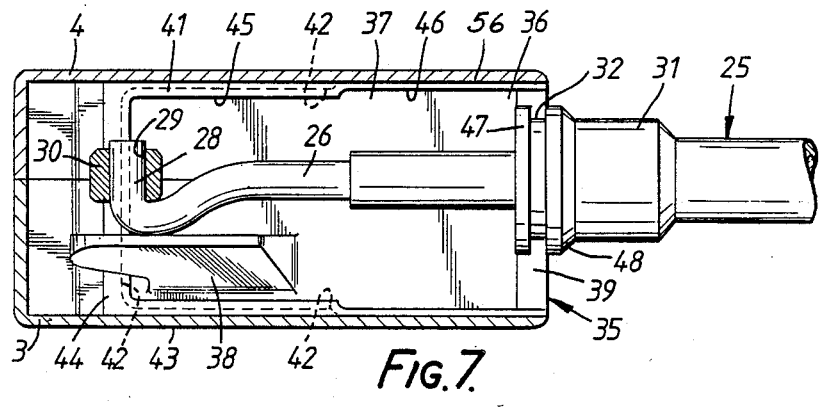
FIG. 7 is a section along line VII—VII of FIG. 2.
Figure 8:
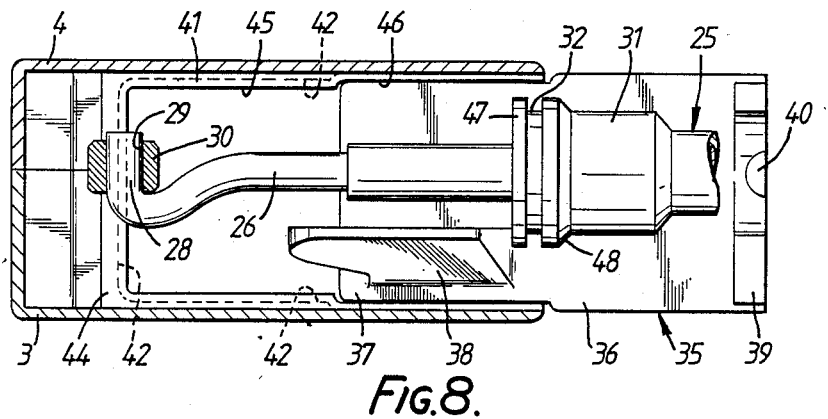
FIG. 8 is a view corresponding to FIG. 7 but showing the retaining slide partly inserted in the housing of the control box.

When the retainer slide 35 is fully inserted, its longitudinal flange 38 is positioned to one side of and adjacent the bent end 28 of the cable core 26, as seen in FIGS. 3 and 7, thereby acting as a stop with respect to that bend end and preventing it from being withdrawn or hooked out from the lever arm 30. Thereby, the core 26 is positively attached to the lever 7.

Just prior to full insertion of the retainer slide 35, its transverse flange 39 slides on to the peripheral region 47 of the cable hub 31 in which the annular groove 32 is provided to bring its protuberance 40 initially into engagement with the hub shoulder 48. The retainer slide 35 is made of resiliently deformable material so that the protuberance 40 will ride over the shoulder 48 and snap into the annular groove 32 thereby positively engaging the retainer slide with the cable hub 31. Such mutual engagement on the one hand positively retains the retainer slide 35 in the housing and, on the other hand, secures the cable hub against axial movement between the protuberance 40 and the housing edges 33. Thereby, the retainer slide 35 acts both to ensure positive attachment of the cable core 26 to the lever 7 and anchorage of the cable casing 27 to the housing 2.

The retainer slide transverse flange 39 is dimensioned and configured so that it closes off the opening 49 in the rear wall 34 of the housing 2 extending from the rear opening 46 of the housing base 41 to the semi-circular edges 33 of that rear wall and fits around the lower periphery 47 of the cable hub, thereby inhibiting the ingress of foreign material into the interior of the housing.

The vertical depth of the transverse flange 39 may be slightly greater than that of the opening 49 in the housing rear wall 34 so that the transverse flange will resiliently deform when pushed home into that opening. Thereby, if the control box 1 is shipped without the cable 25 being assembled to it, the retainer slide 35 will be positively retained in the housing 2 against accidental loss.

Other configurations of the retainer slide flange 39 are possible to enable snap engagement with the annular groove 32 in the cable hub 31 to be obtained. Thus, the protuberance 40 could be omitted, and the whole flange 39 itself dimensioned and configured so as to snap over the hub shoulder 48 and into the hub groove 32.

To enable the retainer slide 35 to be disassembled from the housing 2 for maintenance purposes, a lug 50 may be moulded on to the underside of its front part 37 so that an axial withdrawal force can be applied to the retainer slide.

The control box 1 is constructed so as to be capable of being mounted in various ways. Thus, the open base 41 of the housing 2 may include slots 51 positioned below the slots 42 for receiving a mounting plate 52 with studs 53 depending therefrom. Again, transverse apertures 54 (shown in FIG. 1) may be provided through the housing 2 by which the control box may be gang mounted with similar or different control boxes on a common mounting thereby providing easily accessible manual control over a multitude of functions as governed by the individual boxes. Yet again, although not shown, the housing halves 3 and 4 may be configured together positively to mount securing nuts restrained against motion therein below the top face thereof, so that the housing 2 may be bolted to the underside of a support surface.

To ensure insertion of the retainer slide 35 and mounting plate 52 in their correct slots 42 and 51, respectively, they may be made of different thicknesses together with the associated slots so that they are not interchangeable between the slots.

The individual components of the control box may be made of any suitable material, but it is found that the housing halves may be satisfactorily made as one-piece alloy castings as also may the lever. Further, the retaining slide and locking collar are preferably of a plastics material as also are the bearing shells. In practice, a micro-electric switch arrangement (not shown) would be housed within the housing to indicate the pivotal position of the lever. A blanking cover 55 is depicted closing the opening in the housing through which such a switch arrangement would be inserted.

A second aperture (not shown) can be provided in the lower arm 30 of the lever 7 at a smaller radial distance from the pivot axis of the lever. The bent end 28 of the cable core 27 could then be selectively engaged in either aperture to give different translations of the cable core from the same degree of pivotal motion of the lever handle 9, i.e. the control box then has the facility of providing different velocity ratios. Whether one or two such apertures are provided, the or each aperture can be a blind hole in the lever arm into which the bent end of the cable core is hooked.

As an alternative arrangement (not shown) the end of the cable core could be flattened and apertured, and the lever arm could be fashioned with a transverse pin on to which the apertured end of that cable core would be mounted. In that case, the longitudinal flange 38 of the retainer slide 35 would be located to one side of the flattened end of the cable core to prevent that apertured end from being transversely withdrawn from the transverse pin of the lever arm.

In either case, the plastics material selected for the retainer slide can be such that it will make low friction bearing contact with the bent end of the cable core or the flattened end of the cable core to minimise friction in the mechanism.

Whilst the cable 25 has been described and illustrated as attached to the operator or control end of the remote control mechanism, it is to be appreciated that the attachment structure could be applied as well as, or alternatively, to the distal end of the control cable to be operatively associated with the mechanism to be controlled or operated.

in this specification and claims, the terms "front", "rear", "lower", "lowermost", "upper", "rearmost", "base", "vertical depth" and other terms of orientation and direction are used in the context of the orientation of the control box as viewed in FIG. 1. It is, however, to be understood that the control box is capable of use in other orientations and that the terms of orientation as used herein are only apt when the control box is viewed in its orientation depicted in FIG. 1.

I claim:

1. A remote control mechanism comprising a member mounted for movement in a housing a cable having a core translatable within a casing, transverse aperture means associated with one of the cable core and the member for receiving a transverse connecting part associated with the other of the cable core and the member by which the cable core and the member are operatively connected, and cover plate means for fitment to the housing and serving to engage the cable casing with respect to the housing to prevent translation of the cable casing, wherein the cover plate means has itself an engaging means for restraining the cover plate means within the housing so that when engaging the cable casing with respect to the housing, the cover plate is itself by such action restrained from removal from the housing.

2. A remote control mechanism as claimed in claim 1, wherein the cover plate means also serves to prevent transverse movement between the transverse connecting part and the transverse aperture means such as would result in the cable core and the member being operably disconnected.

3. A remote control mechanism as claimed in claim 1, wherein the transverse aperture means is formed in the member and the transverse connecting part is fast with the cable core.

4. A remote control mechanism as claimed in claim 3, wherein the transverse connecting part is the outermost end of the cable core which is bent and hooked into the aperture means in the member.

5. A remote control mechanism as claimed in claim 1, including an opening in the wall of the housing to permit insertion of the cable core and interconnection of the transverse aperture means and the transverse connecting part, the cover plate means being fitted to the housing to cover the opening.

6. A remote control mechanism as claimed in claim 5, wherein the cover plate means is slidably fitted to the opening.

7. A remote control mechanism as claimed in claim 1, including a cable hub fast with the cable casing and formed for engaging with an end wall of the housing by which to be restrained against translational movement relative to the housing, the cover plate means when fitted to the housing making resilient engagement with the cable hub by which to engage the cable casing with the end wall of the housing and by which the cover plate means is restrained from removal from the housing.

8. A remote control mechanism as claimed in claim 7, wherein the cable hub includes a peripheral groove for receiving the thickness of the end wall of the housing, and the cover plate means makes resilient snap fit engagement in the peripheral groove.

9. A remote control mechanism as claimed in claim 8, wherein the base of the housing is open to permit insertion of the cable core into the housing and interconnection of the transverse aperture means and transverse connecting part, and side walls of the housing on either side of the base are slotted to provide guideways for receiving the cover plate means as a sliding fit closing the open base of the housing.

10. A remote control mechanism as claimed in claim 9, wherein the side walls are joined to the end wall of the housing which has a slot therein whose periphery is complementary to the periphery of the cable hub, the peripheral groove in the cable hub receiving the edges defining the slot in the end wall with a peripheral portion of the cable hub projecting downwardly of the slotted end wall and in the path of sliding travel of the cover plate means as it is fitted to the housing by which the cover plate means will snap radially into the cable hub peripheral groove when it axially registers therewith.

11. A remote control mechanism as claimed in claim 10, wherein the cover plate means has a protuberance at its rear end arranged to ride over a shoulder on the cable hub as the cover plate means is slidably fitted to the housing and then snap into the peripheral groove in the cable hub when axially in register therewith.

12. A remote control mechanism as claimed in claim 10, wherein the cover plate means has a transverse flange projecting therefrom at its rear end which closes an opening in the rear wall of the housing extending from the slot therein to the open base of the housing and which is arranged to fit around the downwardly projecting peripheral portion of the cable hub.

13. A remote control mechanism as claimed in claim 12, wherein the transverse flange is larger than the opening in the rear wall of the housing and is resiliently deformable by which to engage therein.

14. A remote control mechanism as claimed in claim 9, wherein the cover plate means includes a withdrawal means for withdrawing the cover plate means from the housing.

15. A remote control mechanism as claimed in claim 9, wherein the cover plate means has a longitudinal flange projecting therefrom at its front end which is positioned to one side and adjacent the cable core at the region of interconnection of the transverse aperture means and transverse connecting part when the cover plate means is fitted to the housing to prevent transverse disconnection of the cable core relative to the member.

16. A remote control mechanism as claimed in claim 15, wherein the front part of the open base is narrower than its rear part, and the cover plate means is correspondingly dimensioned.

17. A remote control mechanism as claimed in claim 1, wherein the cover plate means is a retainer slide made of a resiliently deformable material.

18. A remote control mechanism comprising:
a member mounted for movement in a housing,
a cable having a core translatable within a casing,
wherein the member is said member pivotally mounted in the housing and with a handle extending outwardly of the housing for manual operation by which to translate the cable core;
transverse aperture means associated with one of the cable core and the member for receiving a transverse connecting part associated with the other of the cable core and the member by which the core cable and the member are operatively connected;
a locking collar slideably mounted on the lever handle, wherein the locking colar provides locking engagement with the housing to retain the lever in a predetermined position; and
cover plate means for fitment to the housing and serving to engage the cable casing with respect to the housing to prevent translation of the cable casing.

19. A remote control mechanism as claimed in claim 18, wherein the locking collar has radially opposed lugs engageable in complementary slots fashioned in the housing.

20. A remote control mechanism as claimed in claim 18, including torsional spring means for resisting pivotal movement of the lever either side of a central position.

* * * * *